Patented Dec. 9, 1930　　　　　　　　　　　　　　　　　1,784,498

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS OF VULCANIZING RUBBER AND PRODUCT OBTAINED THEREFROM

No Drawing.　　　　Application filed August 5, 1929.　Serial No. 383,773.

The present invention relates to processes for vulcanizing rubber and similar materials and to the products obtained thereby, and is particularly directed to the acceleration of the vulcanizing step by employing in that step the reaction product of a mercapto-benzo-thiazole, preferably an alkali metallic salt of mercapto-benzo-thiazole, and a dichloracetate.

While the preferred class of accelerators may be used alone as vulcanization accelerators, it is preferable that they be employed with an organic amine accelerating compound, preferably a guanidine, for example diphenyl-guanidine, to form a mixed accelerator.

It is thought the reaction, whereby the preferred class of compounds is formed, proceeds as follows:

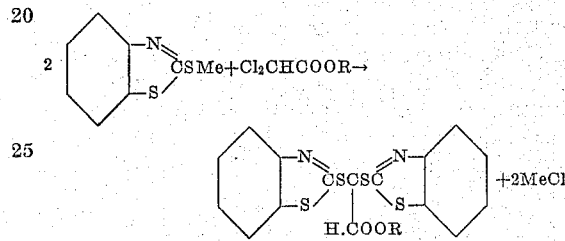

wherein Me represents a member of the alkali series of metal and R represents a salt or ester forming element or group of elements.

One of the preferred class of compounds, for example, the reaction product of sodium mercapto-benzo-thiazole and ammonium dichloracetate was prepared according to the following manner:

An aqueous solution of substantially two-tenths of a molar portion (25.8 parts) of ammonium dichloracetate was added to an aqueous solution of substantially four-tenths of a molar portion (75.6 parts) of the sodium salt of mercapto-benzo-thiazole. These reactants when mixed gave a clear red solution. This was warmed on the steam bath for approximately one hour. A heavy straw-colored oil which was separated by the salting out effect of the sodium chloride present was drawn off, dissolved in water and precipitated with a mineral acid, for example hydrochloric acid. The product thus obtained was a pale yellow gummy product. This product was further purified by dissolving in aqueous ammonia and reprecipitated with a mineral acid, for example hydrochloric acid.

A sample of this material was compounded in the usual manner in a rubber mix of the following composition:

100　parts of pale crepe rubber,
　5　parts of zinc oxide,
　3.5　parts of sulfur,
　.75 parts of the acidified reaction product of ammonium dichloracetate and sodium mercapto-benzo-thiazole.

On testing strips of the above described stock, vulcanized by heating in a press for different periods of time under temperatures given by different steam pressures, the following tensile data were obtained:

| Cure mins. | Pressure lbs. steam | Modulus of elasticity in lbs./in.² at elongations of— | | | Tensile at break | Elongation at break % |
|---|---|---|---|---|---|---|
| | | 300% | 500% | 700% | | |
| 30 | 20 | 71 | 133 | 462 | 1860 | 960 |
| 60 | 20 | 94 | 183 | 738 | 2260 | 900 |
| 15 | 40 | 66 | 88 | 411 | 1645 | 955 |
| 30 | 40 | 72 | 165 | 672 | 2405 | 920 |
| 60 | 40 | 70 | 170 | 717 | 2523 | 925 |

From the above results it is evident that the reaction product set forth possesses certain accelerating properties. These properties are materially increased if the preferred class of accelerators are employed in conjunction with an organic amine accelerating compound, for example diphenyl-guanidine.

As an example of this process, a rubber stock was compounded in the usual manner comprising 100　parts of pale crepe rubber,
　5　parts of zinc oxide,
　3.5　parts of sulfur,
　.5　parts of diphenyl-guanidine,
　.25 parts of the acidified reaction product of ammonium dichloracetate and sodium mercapto-benzo-thiazole.

On testing strips of the above stock, vulcanized by heating in a press for different periods of time at different temperatures, the following tensile data were obtained:

| Cure mins. | Pressure lbs. steam | Modulus of elasticity in lbs./in.² at elongations of— | | | Tensile at break | Elongation at break % |
|---|---|---|---|---|---|---|
| | | 300% | 500% | 700% | | |
| 30 | 10 | 50 | 95 | 336 | 1808 | 985 |
| 60 | 10 | 80 | 181 | 787 | 2160 | 885 |
| 30 | 20 | 106 | 289 | 1155 | 2515 | 850 |
| 60 | 20 | 134 | 497 | 1950 | 3095 | 770 |
| 15 | 40 | 165 | 462 | 1793 | 3055 | 795 |
| 30 | 40 | 152 | 582 | 2318 | 3400 | 785 |

The above results show that the preferred class of vulcanization accelerators exerted greatly increased accelerating power when employed as a component of a mixed accelerator in conjunction with a basic activator, specifically diphenyl-guanidine.

Another example of the preferred class of compounds comprises the reaction product of the sodium salt of mercapto-benzo-thiazole and ethyl dichloracetate. This material was prepared in the following manner:

An alcoholic solution of substantially two-tenths of a molar portion (37.8 parts) of sodium mercapto-benzo-thiazole was prepared and substantially one-tenth of a molar portion (15.7 parts) of ethyl dichloracetate was added thereto and the product warmed on the steam bath. Crystals of sodium chloride separated almost immediately. After standing overnight these crystals were filtered off. The reaction product, which separated from the alcoholic solution, was a heavy red oil. The product so obtained was washed with alcohol, then dissolved in ether and the solvent evaporated therefrom.

A sample of the above described material was compounded in the usual manner in a rubber mix of the following composition:

100 parts of pale crepe rubber,
5 parts of zinc oxide,
3.5 parts of sulfur,
.75 parts of the reaction product of sodium mercapto-benzo-thiazole and ethyl dichloracetate.

After vulcanizing the above described stock, a rubber product possessing the following tensile characteristics was obtained:

| Cure mins. | Pressure lbs. steam | Modulus of elasticity in lbs./in.² at elongations of— | | | Tensile at break | Elongation at break % |
|---|---|---|---|---|---|---|
| | | 300% | 500% | 700% | | |
| 30 | 20 | 87 | 173 | 733 | 1830 | 860 |
| 60 | 20 | 130 | 285 | 1258 | 2610 | 830 |
| 15 | 40 | 93 | 187 | 773 | 2265 | 900 |
| 30 | 40 | 111 | 258 | 1013 | 2685 | 870 |
| 60 | 40 | 128 | 320 | 975 | 2830 | 890 |

The reaction product of sodium mercapto-benzo-thiazole and ethyl dichloracetate is, however, preferably employed in conjunction with an organic amine accelerating compound, for example diphenyl-guanidine to form a mixed accelerator.

Thus, a rubber stock was compounded in the usual manner comprising 100 parts of pale crepe rubber,
5 parts of zinc oxide,
3.5 parts of sulfur,
.5 parts of diphenyl-guanidine,
.25 parts of the reaction product of ethyl dichloracetate and sodium mercapto-benzo-thiazole.

After vulcanizing the above described stock, a rubber product possessing the following tensile characteristics was obtained:

| Cure mins. | Pressure lbs. steam | Modulus of elasticity in lbs./in.² at elongations of— | | | Tensile at break | Elongation at break % |
|---|---|---|---|---|---|---|
| | | 300% | 500% | 700% | | |
| 20 | 10 | 75 | 137 | 638 | 1940 | 910 |
| 60 | 10 | 54 | 142 | 641 | 1943 | 915 |
| 30 | 20 | 122 | 406 | 1650 | 2830 | 800 |
| 60 | 20 | 156 | 612 | 2455 | 3465 | 740 |
| 15 | 40 | 122 | 450 | 1830 | 3645 | 825 |
| 30 | 40 | 198 | 677 | 2705 | 3670 | 750 |
| 60 | 40 | 268 | 934 | 3460 | 3515 | 705 |

The examples hereinbefore set forth show clearly the fact that the preferred class of compounds form an important group of rubber accelerators which function either alone but preferably in connection with an organic amine accelerating compound, preferably a guanidine, as a mixed accelerator.

Other mercapto-benzo-thiazoles may be reacted with other dichloracetates in a manner similar to that described above. Thus potassium mercapto-benzo-thiazole, amino, nitro and chlor benzo-thiazoles and the like may be reacted with an alkali metallic salt, as sodium or potassium, of dichloracetic acid or the alkyl esters thereof, as methyl, propyl and butyl esters, to form the preferred class of rubber accelerators, which may be used alone or in conjunction with an organic amine accelerating compound, preferably a guanidine as for example diphenyl-guanidine, diorthotolyl-guanidine and the like, to form a mixed accelerator.

The foregoing examples are to be understood as illustrative only and not at all limitative of the invention. Other vulcanized products may be obtained by employing other compounding ingredients and other proportions of ingredients than those particularly set forth in the examples given.

What is claimed is:

1. The process of producing vulcanized rubber which comprises heating rubber and sulfur in the presence of a vulcanization accelerating product containing a reaction product of a dichloracetate and a mercapto-benzo-thiazole as a constituent thereof.

2. The process of producing vulcanized rubber which comprises heating rubber and sulfur in the presence of a vulcanization accelerating product containing a reaction product of a dichloracetate and an alkali salt of mercapto-benzo-thiazole as a constituent thereof.

3. The process of producing vulcanized rubber which comprises heating rubber and sulfur in the presence of a vulcanizing accelerating product containing a reaction product of a dichloracetate and sodium mercapto-benzo-thiazole as a constituent thereof.

4. The process of producing vulcanized rubber which comprises heating rubber and sulfur in the presence of a vulcanization accelerating product containing a reaction product of an alkyl ester of dichloracetic acid and sodium mercapto-benzo-thiazole as a constituent thereof.

5. The process of producing vulcanized rubber which comprises heating rubber and sulfur in the presence of a vulcanization accelerating product containing a reaction product of ethyl dichloracetate and a mercapto-benzo-thiazole as a constituent thereof.

6. The process of producing vulcanized rubber which comprises heating rubber and sulfur in the presence of a vulcanization accelerating product containing a reaction product of ethyl dichloracetate and an alkali salt of mercapto-benzo-thiazole as a constituent thereof.

7. The process of producing vulcanized rubber which comprises heating rubber and sulfur in the presence of a vulcanization accelerating product containing a reaction product of ethyl dichloracetate and sodium mercapto-benzo-thiazole as a constituent thereof.

8. The process of producing vulcanized rubber which comprises heating rubber and sulfur in the presence of a mixture of accelerators, said accelerators comprising a reaction product of a dichloracetate and a mercapto-benzo-thiazole and a guanidine vulcanization accelerator.

9. The process of producing vulcanized rubber which comprises heating rubber and sulfur in the presence of a mixture of accelerators, said accelerators comprising a reaction product of a dichloracetate and a mercapto-benzo-thiazole and a diaryl guanidine vulcanization accelerator.

10. The process of producing vulcanized rubber which comprises heating rubber and sulfur in the presence of a mixture of accelerators, said accelerators comprising a reaction product of a dichloracetate and a mercapto-benzo-thiazole and diphenyl-guanidine.

11. The process of producing vulcanized rubber which comprises heating rubber and sulfur in the presence of a mixture of accelerators, said accelerators comprising a reaction product of a dichloracetate and an alkali salt of mercapto-benzo-thiazole and diphenyl-guanidine.

12. The process of producing vulcanized rubber which comprises heating rubber and sulfur in the presence of a mixture of accelerators, said accelerators comprising a reaction product of a dichloracetate and the sodium salt of mercapto-benzo-thiazole and diphenyl-guanidine.

13. The process of producing vulcanized rubber which comprises heating rubber and sulfur in the presence of a mixture of accelerators, said accelerators comprising a reaction product of an alkyl ester of dichloracetic acid and the sodium salt of mercapto-benzo-thiazole and diphenyl-guanidine.

14. The process of producing vulcanized rubber which comprises heating rubber and sulfur in the presence of a mixture of accelerators, said accelerators comprising a reaction product of ethyl dichloracetate and sodium mercapto-benzo-thiazole and diphenyl-guanidine.

15. The vulcanized rubber product prepared by heating rubber and sulfur in the presence of a vulcanization accelerating product containing a reaction product of a dichloracetate and a mercapto-benzo-thiazole as a constituent thereof.

16. The vulcanized rubber product prepared by heating rubber and sulfur in the presence of a vulcanization accelerating product containing a reaction product of an alkyl ester of dichloracetic acid and sodium mercapto-benzo-thiazole as a constituent thereof.

17. The vulcanized rubber product prepared by heating rubber and sulfur in the presence of a vulcanization accelerating product containing a reaction product of ethyl dichloracetate and sodium mercapto-benzo-thiazole as a constituent thereof.

18. The vulcanized rubber product prepared by heating rubber and sulfur in the presence of a mixture of accelerators, said accelerators comprising a reaction product of a dichloracetate and an alkali salt of mercapto-benzo-thiazole and diphenyl-guanidine.

19. The vulcanized rubber product prepared by heating rubber and sulfur in the presence of a mixture of accelerators, said accelerators comprising a reaction product of an alkyl ester of dichloracetic acid and the sodium salt of mercapto-benzo-thiazole and diphenyl-guanidine.

20. The vulcanized rubber product prepared by heating rubber and sulfur in the presence of a mixture of accelerators, said accelerators comprising a reaction product of ethyl dichloracetate and sodium mercapto-benzo-thiazole and diphenyl-guanidine.

In testimony whereof I hereunto affix my signature.

WINFIELD SCOTT.